United States Patent
Lin

(10) Patent No.: US 7,162,566 B2
(45) Date of Patent: Jan. 9, 2007

(54) USB-BASED HOST-TO-HOST NETWORKING METHOD

(75) Inventor: Hao-Hsing Lin, Taipei Hsien (TW)

(73) Assignee: ALi Corporation, Taipei (TW)

( * ) Notice: Subject to any disclaimer, the term of this patent is extended or adjusted under 35 U.S.C. 154(b) by 257 days.

(21) Appl. No.: 10/865,773

(22) Filed: Jun. 14, 2004

(65) Prior Publication Data
US 2005/0033880 A1   Feb. 10, 2005

(30) Foreign Application Priority Data
Aug. 7, 2003   (TW) .............................. 92121916 A

(51) Int. Cl.
*G06F 13/00*   (2006.01)
(52) U.S. Cl. ................. 710/314; 710/313; 710/306
(58) Field of Classification Search ................ None
See application file for complete search history.

(56) References Cited

U.S. PATENT DOCUMENTS

2003/0212841 A1* 11/2003 Lin ............................. 710/62
2004/0186926 A1*  9/2004 Rapaich ........................ 710/8
2005/0182883 A1*  8/2005 Overtoom .................. 710/305

OTHER PUBLICATIONS

"PL-2501 Hi-Speed USB Host to Host Bridge Controller V1.0" product brochure; Prolific Technology Inc.; Taipei, Taiwan; Sep. 11, 2002.*
Brownell, David; "The GNU/Linux 'usbnet' Driver Framework"; www.linux-usb.org/usbnet/ accessed Apr. 25, 2006, last modified Sep. 27, 2005.*
Derwent Patent Abstract for TW 390984 A, published May 21, 2000, Inventor: Shiu, S.*
English language translation for Taiwan/Chinese patent 390,984, Document No. 0087110621, Inventor Xu Shuoyang, Publication date May 21, 2000.*

* cited by examiner

*Primary Examiner*—Glenn A. Auve
(74) *Attorney, Agent, or Firm*—Troxell Law Office, PLLC

(57) ABSTRACT

The present invention relates to a USB-based host-to-host networking method capable of transferring information between two hosts. Devices for the method comprise: a register, a pair of FIFO control command transmitters and at least one FIFO bulk transmitter.

The register is to temporarily store control commands for information transaction and acts as a buffer. The control command transmitters is to connect two serial interface engines interfacing respectively with the USB interface of each host, by which the information transfer control commands can be delivered from either host. The bulk information transmitter connects to the two serial interface engines for bulk transfer so that any host is capable of issuing the information transfer control commands for executing data transaction between hosts.

The present invention provides a new design for networking controller connection by reducing the number of control command transmitters needed, and also capable of transferring bulk information between hosts.

39 Claims, 11 Drawing Sheets

USB-BASED HOST-TO-HOST NETWORKING METHOD

FIELD OF THE INVENTION

The present invention relates to an USB-based host-to-host networking method capable of transmitting streams of data between PCs or notebooks via USBs, and more particularly, between two or more hosts capable of issuing control commands to control the transmission.

BACKGROUND OF THE INVENTION

USB specification was published in 1996 to provide an easy and economical method for connecting all kinds of peripheries with PCs., and has become a main interface for printers, scanners and CD burners thereafter. In year 2000, in addition to the full-speed mode (FS) of 12 Mbps and the low-speed mode (LS) of 1.5 Mbps for the USB 2.0 interface, a high-speed mode (HS) of 480 Mbps was provided for increasing the USB transmission speed by forty times of the original speed that enables the USB interface to become more suitable for high-performance peripheries, such as high-volume storage device, digital video camcorder, etc. Nowadays, the USB specification has stepped into an advance level to offer more services for mobile devices. In December of 2001, a supplement to the USB 2.0 specification had been issued to define the theories of mechanism, electrics, and communication protocol, etc. for enabling the USB interface to be applied onto the mobile devices.

The USB transfers signal and power over a four-wire cable. The signaling occurs over two wires on each point-to-point segment. For an high-speed external device that requires great bandwidth, the USB interface will adopt the full-speed mode of 12 Mbps for the transmission, on the other hand, for a low-speed external device, the USB interface will adopt the low-speed mode of 1.5 Mbps for the transmission. The USB interface can automatically detect and switch between the HS mode and the LS mode dynamically according to the external device connected therewith. USB interface is a serial bus for primitives which is similar to the serial bus for the token-ring or the primitives of the fiber distributed data interface (FDDI). The controller of the USB interface broadcasts commands for checking whether the address of commands of the equipment connected to the serial bus matches with that of the USB interface or not through receiving/transmitting data of the host. Additionally, the USB interface manages power of the serial bus by way of append/restore operation. The USB physically interconnected is a tiered star topology, consisting of three basic parts: host, hub and device.

There is only one host in any USB system. The USB interface to the host computer system is referred to as the host controller. The host comprises a host controller and a root-hub where the host Controller may be implemented in a combination of hardware, firmware, or software, which is capable of controlling the data transmission over the USB system, and the root hub is integrated within the host by connecting to the host controller to provide one or more attachment points.

A hub is a USB device that provides additional connections to the USB and is capable of providing power management and malfunction detection/restoration to the USB devices connected to the same. Each USB segment provides a limited amount of power over the cable. The host supplies power for use by USB devices that are directly connected. In addition, any USB device may have its own power supply. USB devices that rely totally on power from the cable are called bus-powered devices. In contrast, those that have an alternate source of power are called self-powered devices. A hub also supplies power for its connected USB devices. The specification of USB protocol defines that a USB frame is produced per millisecond, and a USB device can transmit and receive one transaction in each frame. A transaction is consisted of a plurality of packets, and a transmission is completed with at least one transaction for transferring a series of meaningful data. Herein a transmission is the same as a report. The USB supports functional data and control exchange between the USB host and a USB device as a set of either uni-directional or bi-directional pipes. USB data transfers take place between host software and a particular endpoint on a USB device. Such associations between the host software and a USB device endpoint are called pipes. In general, data movement though one pipe is independent from the data flow in any other pipe. A given USB device may have many pipes. As an example, a given USB device could have an endpoint that supports a pipe for transporting data to the USB device and another endpoint that supports a pipe for transporting data from the USB device. The USB architecture comprises two basic types of data transfers, i.e. control transfer and interrupt transfer. The Control transfer is used to configure a device at attach time and can be used for other device-specific purposes, including control of other pipes on the based on demand and the most general, which is used mainly for transferring message-type data. The interrupt transfer is used for characters or coordinates with human-perceptible echo or feedback response characteristics, wherein a small, limited-latency transfer to or from a device is referred to as interrupt data and such data may be presented for transfer by a device at any time and is delivered by the USB at a rate no slower than is specified by the device, which is adaptable for transferring stream-type data. Interrupt data typically consists of event notification, characters, or coordinates that are organized as one or more bytes. An example of interrupt data is the coordinates from a pointing device. Although an explicit timing rate is not required, interactive data may have response time bounds that the USB must support.

Data transaction between USBs is represented as report of data transfer, and the report descriptor is used for illustrating the usage of the report. There are three kinds of report: the input report, the output report and the feature report. The interrupt in pipe can only be used for transmitting the input report, the interrupt out pipe can only be used for transmitting the output report, and the control pipe can be used for transmitting all the input report, the output report and the feature report. The end point descriptor may announce what types of pipes are used for the end point. Descriptor is used for illustrating the usage of the transferred data which is meaningless by itself, and thus the kind of control specified by the descriptor can be performed. For example, buttons, indicating lights and displacements of x-axis and y-axis are generally referred as control, and the statuses of the buttons and the indicating lights or amount of displacement of x-axis and y-axis are referred as data. The report descriptors with respect to the corresponding controls are mapped one-on-one with the data by which data can be controlled accordingly.

There is only one host for each USB. The major layers of a host consist of the following:

(1) USB bus interface: The USB bus interface handles interactions for the electrical and protocol layers. From the interconnect point of view, a similar USB bus interface is provided by both the USB device and the host, as exemplified by the Serial Interface Engine (SIE). On the host, however, the USB bus interface has additional responsibilities due to the unique role of the host on the USB and is implemented as the host controller. The host controller has an integrated root hub providing attachment points to the USB wire.

(2) USB System: The USB System uses the host controller to manage data transfers between the host and USB devices. The interface between the USB System and the host controller is dependent on the hardware definition of the host controller. The USB System is also responsible for managing USB resources, such as bandwidth and bus power, so that client access to the USB is possible.

(3) Client: The client layer describes all the software entities that are responsible for directly interacting with USB devices. When each device is attached to the system, these clients might interact directly with the peripheral hardware. The shared characteristics of the USB place USB System Software between the client and its device; that is, a client cannot directly access the device's hardware.

In addition, the USB System has three basic components as following:

(1) Host Controller Driver: The Host Controller Driver (HCD) exists to more easily map the various Host Controller implementations into the USB System, such that a client can interact with its device without knowing to which Host Controller the device is connected. The USB Driver (USBD) provides the basic host interface (USBDI) for clients to USB devices. The interface between the HCD and the USBD is known as the Host Controller Driver Interface (HCDI). This interface is never available directly to clients and thus is not defined by the USB Specification. A particular HCDI is, however, defined by each operating system that supports various Host Controller implementations.

(2) USB Driver: The USBD provides data transfer mechanisms in the form of I/O Request Packets (IRPs), which consist of a request to transport data across a specific pipe. In addition to providing data transfer mechanisms, the USBD is responsible for presenting to its clients an abstraction of a USB device that can be manipulated for configuration and state management. As part of this abstraction, the USBD owns the default through which all USB devices are accessed for the purposes of standard USB control. This default pipe represents a logical communication between the USBD and the abstraction of a USB device.

(3) Host Software: In some operating systems, additional non-USB System Software is available that provides configuration and loading mechanisms to device drivers. In such operating systems, the device driver shall use the provided interfaces instead of directly accessing the USBDI mechanisms.

The USB is a polled bus. The Host Controller initiates all data transfers. All bus transactions involve the transmission of up to three packets. Each transaction begins when the Host Controller, on a scheduled basis, sends a USB packet describing the type and direction of transaction, the USB device address, and endpoint number. This packet is referred to as the "token packet." The USB device that is addressed selects itself by decoding the appropriate address fields. In a given transaction, data is transferred either from the host to a device or from a device to the host. The direction of data transfer is specified in the token packet. The source of the transaction then sends a data packet or indicates it has no data to transfer. The destination, in general, responds with a handshake packet indicating whether the transfer was successful. Field formats for the token, data, and handshake packets in the USB specification are defined using a 4-bit Packet Identifier (PID). An endpoint is a uniquely identifiable portion of a USB device that is the terminus of a communication flow between the host and device. Each USB logical device is composed of a collection of independent endpoints.

In the present product design, FIFO is the most general form used to construct endpoints due to that the essence of FIFO being able to contain a packet. Therefore, Each logical device has a unique address assigned by the system at device attachment time. Each endpoint on a device is given at design time a unique device-determined identifier called the endpoint number. Each endpoint has a device-determined direction of data flow. The combination of the device address, endpoint number, and direction allows each endpoint to be uniquely referenced. Each endpoint is a simplex connection that supports data flow in one direction: either input (from device to host) or output (from host to device).

All USB devices are required to implement a default control method that uses both the input and output endpoints with endpoint number zero, i.e. Endpoint-0. The USB System Software uses this default control method to initialize and generically manipulate the logical device (e.g., to configure the logical device) as the Default Control Pipe. The Default Control Pipe provides access to the device's configuration information and allows generic USB status and control access. The endpoints with endpoint number zero are always accessible once a device is attached, powered, and has received a bus reset. Functions can have additional endpoints as required for their implementation. Low-speed (LS) functions are limited to two optional endpoints beyond the two required to implement the Default Control Pipe. Full-speed (FS) devices can have additional endpoints only limited by the protocol definition (i.e., a maximum of 15 additional input endpoints and 15 additional output endpoints). A hub device can detect a supported transfer rate. It is known that USB interface implements differential data output depending on two signal wires which are D+ and D−. Thus the device recognizes a supported transfer rate via a pull-up state of the two signal wires. While the D+ signal being pulled up, it represents the FS mode; otherwise, D− signal being pulled up represents the LS mode. In this regard, when the device is being attached to a connecting port of a USB hub, the hub may detect the transfer rate of the device. Moreover, the transfer category and the rate thereof are provided in the max payload size field, that is, the size of the FIFO.

The USB supports functional data and control exchange between the USB host and a USB device as a set of either uni-directional or bi-directional pipes. USB data transfers take place between host software and a particular endpoint on a USB device. Such associations between the host software and a USB device endpoint are called pipes. In general, data movement though one pipe is independent from the data flow in any other pipe. A given USB device may have many pipes. As an example, a given USB device could have an endpoint that supports a pipe for transporting data to the USB device and another endpoint that supports a pipe for transporting data from the USB device. The USB architecture comprehends four basic types of data transfers:

(1) Control Transfers: Control data is used by the USB System Software to configure devices when they are first attached. Other driver software can choose to use control transfers in implementation-specific ways. Data delivery is lossless.

(2) Bulk Data Transfers: Bulk data typically consists of larger amounts of data, such as that used for printers or scanners. Bulk data is sequential. Reliable exchange of data is ensured at the hardware level by using error detection in hardware and invoking a limited number of retries in hardware. Also, the bandwidth taken up by bulk data can vary, depending on other bus activities.

(3) Interrupt Data Transfers: Interrupt data typically consists of event notification, characters, or coordinates that are organized as one or more bytes. An example of interrupt data is the coordinates from a pointing device. Although an explicit timing rate is not required, interactive data may have response time bounds that the USB must support.

(4) Isochronous Data Transfers: Isochronous data is continuous and real-time in creation, delivery, and consumption. Timing-related information is implied by the steady rate at which isochronous data is received and transferred. Isochronous data must be delivered at the rate received to maintain its timing. In addition to delivery rate, isochronous data may also be sensitive to delivery delays. For isochronous pipes, the bandwidth required is typically based upon the sampling characteristics of the associated function. The latency required is related to the buffering available at each endpoint.

USB bandwidth is allocated among pipes. The USB allocates bandwidth for some pipes when a pipe is established. USB devices are required to provide some buffering of data. It is assumed that USB devices requiring more bandwidth are capable of providing larger buffers. The USB's bandwidth capacity can be allocated among many different data streams. This allows a wide range of devices to be attached to the USB. Further, different device bit rates, with a wide dynamic range, can be concurrently supported.

SUMMARY OF THE INVENTION

Nowadays, it is more than common for a family or company to have more than one computer as it is being used for all kind of works. Thus, a kind of network, such as Local Area Network (LAN) is required to handle the data exchange among computers that are becoming more and more complicated. To construct a LAN using conventional network interface cards (NIC) and networking wires will require excellent networking layout experience and knowledge along with plenty of peripheral hardware and adaptors. However, most of the company or individual do not possess enough know-how for doing so and require an engineer to do the job for them that incurs additional cost. Hence, a simple way to construct a network is in much demand. After Pentium Chip is provided in the market, most mother boards are integrated with USB interfaces which can be used for networking. The data linkage between two PCs can be accomplished simply by connecting the USB interfaces thereof without requiring additional hardware and know-how.

Many users have more than one computer or notebook thesedays. It is really a hassle while requiring to transfer a great amount of data between two computers, especially when one of which has no NIC installed therein. Moreover, there are many obstacles for a user to install a NIC on a computer, such as open the casing and install driver of the NIC, and one might meet interrupt conflicts during the installation. The conventional way of using serial and parallel cable connections as the "direct cable connection" of Windows 98 is simple but the transfer rate is unsatisfactory due to the band width of only 1.5 Mbps that it is inapplicable to high-volume transaction Another solution is to employ the USB feature of plug-and-play to engage in data transfer among computers. The bandwidth as defined in the USB 1.1 specification is 12 Mbps, which is much faster than the previous parallel cable connection. Further, the USB supports hot plug. The USB-TO-LINK cable currently available on the market comprises an USB-HOST-LINK cable and a driver including installation software. Two computers both have USB interfaces may be connected by the USB-HOST-LINK cable for transferring data jut by inserting the two plugs of the cable respectively into the USB socket of the computer. However, The current products on the market still have shortcomings, such as incomplete software and high cost, etc.

To improve the above issues, the present invention provides an USB-based host-to-host networking method by refining the single-control-chip of USB 2.0. The present invention uses a first, a second and a third pipe all defined by USB specification to perform data transaction among computers according to different definitions of physical pipe and logical pipe. Referring to FIG. 1, which is a functional block diagram of the present invention. As seen, the first host C1 is being connected with the second host C2 through the USB networking device 1, wherein the USB networking device 1 comprises: an embedded endpoint FIFOs 31, a host-to-host networking controller 32, a configuration register 39, an embedded micro-controller unit 33 (MCU) and two connecting interfaces 35 arranged at the sides respectively corresponding to the first host C1 and the second host C2, and the connecting interface 35 further comprises: an USB transceiver 36, an USB interface controller 37 and a clock synthesizer 38. When the first host C1 is going to send streams of data to the second host C2, it is required for the first host C1 to send a transfer signal to the embedded endpoint FIFOs 31 prior the data transmission for informing the embedded MCU 32 that the first host C1 is in a ready-to-transmit state, in addition, the transfer signal comprises a command instruction and a state instruction. At the same time, the embedded endpoint FIFOs 31 sends an interrupt signal to the second host C2 for directing the second host C2 to interrupt its normal procedures and enter a ready-to-receive state. When the embedded MCU 33 detects that the first host C1 is sending a transfer signal to the embedded endpoint FIFOs 31, the embedded MCU 33 is aware that the first host C1 is going to transmit streams of data, and the transfer signal received by the embedded endpoint FIFOs 31 contains a destination information. Thus, the embedded MCU 33 stores the destination information to the configuration register 39 and performs a handshaking operation for enabling the second host C2 to enter a start-to-receive state, and then outputting the destination information from the embedded endpoint FIFOs 31 to the second host C2.

Vice versa, When the second host C2 is going to send streams of data to the first host C1, it is required for the second host C2 to send a transfer signal to the embedded endpoint FIFOs 31 prior the data transmission for informing the embedded MCU 32 that the second host C2 is in a ready-to-transmit state, in addition, the transfer signal comprises a command instruction and a state instruction. At the same time, the embedded endpoint FIFOs 31 sends an interrupt signal to the first host C1 for directing the first host C1 to interrupt its normal procedures and enter a ready-to-receive state. When the embedded MCU 33 detects that the second host C2 is sending a transfer signal to the embedded endpoint FIFOs 31, the embedded MCU 33 is aware that the second host C2 is going to transmit streams of data, and the transfer signal received by the embedded endpoint FIFOs 31 contains a destination information. Thus, the embedded MCU 33 stores the destination information to the configuration register 39 and performs a handshaking operation for enabling the first host C1 to enter a start-to-receive state, and then outputting the destination information from the embedded endpoint FIFOs 31 to the first host C1.

The USB-based networking solution for two or more USB hosts of PC/notebook of the present invention features: USB specification revision 2.0 compliant, and glueless single-chip integration with two on-chip USB 2.0 transceiver, controllers and Ping-Pong FIFOs. Furthermore, the built-in high-performance micro-processor accompanying the present invention enables users to interface with external devices for data sharing with ease.

The advantages of the present invention are as following: (1) the optimal transfer rate of a single-chip USB host-to-host being up to 8~15 Mbps; (2) supporting WINDOWS 98/2000/ME/XP and Mac OSR2/98/2000; (3) document transferring being established by drag and drop similar to mode of resource management window; (4) supporting network printing; (5) supporting USB 1.1 specification with good compatibility; (6) ease to install; (7) having small volume and light weight for carrying.

DETAILED DESCRIPTION OF THE PREFERRED EMBODIMENTS

Figure 1:
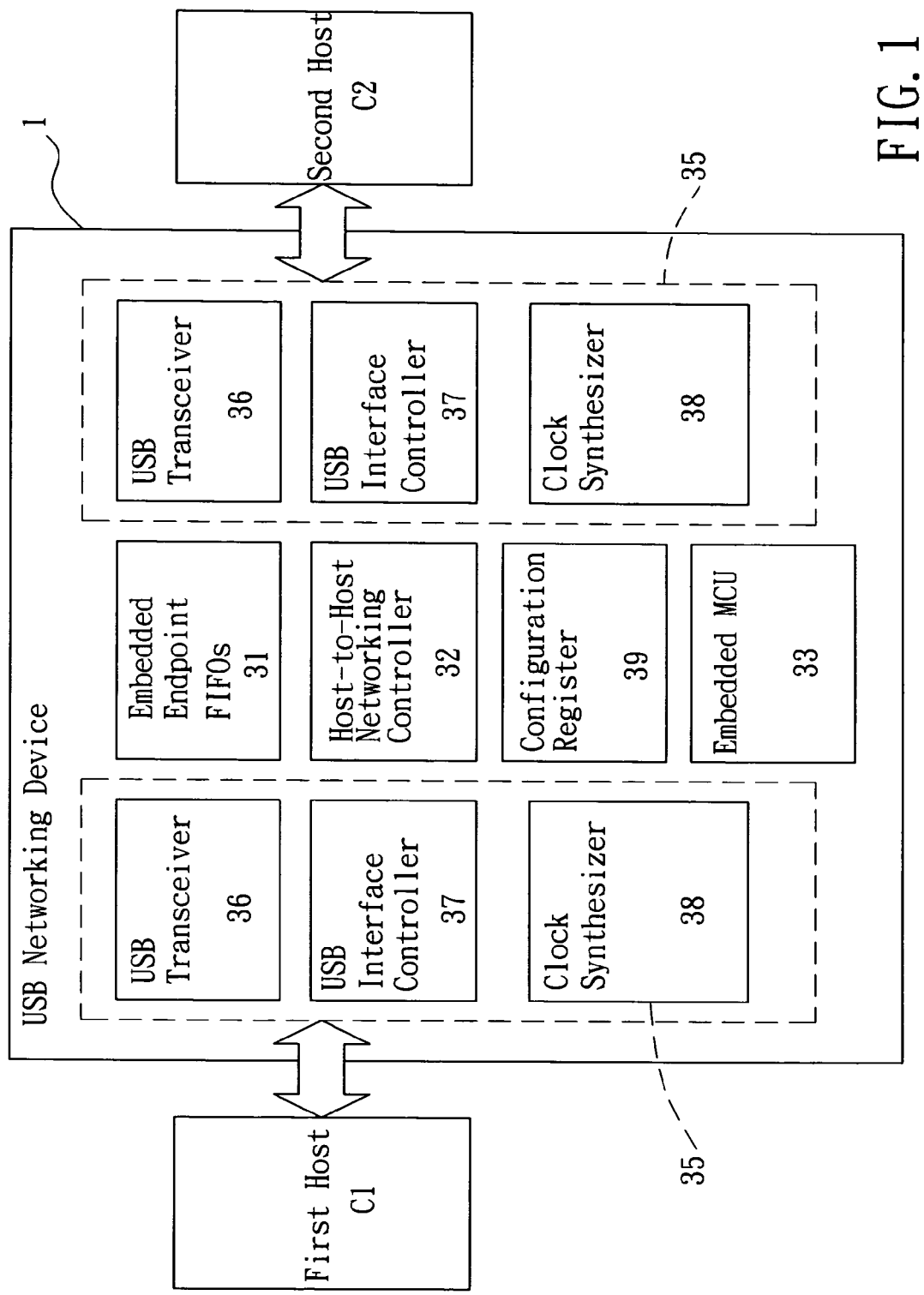
FIG. 1 is a functional block diagram of the present invention.
Figure 2:
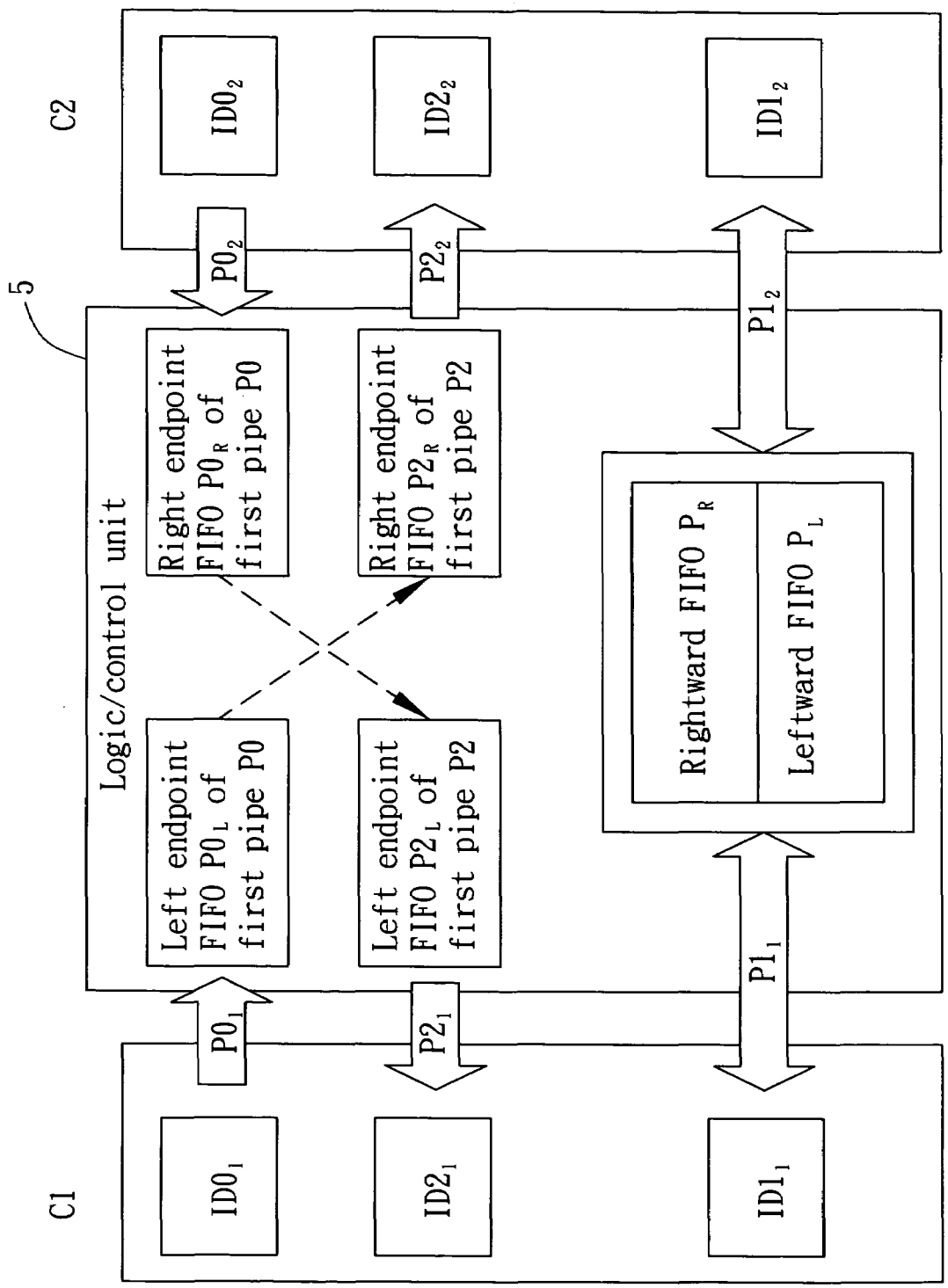
FIG. 2 is a diagram showing a first preferred embodiment of the present invention.

Please refer to FIG. 2, which is a diagram depicting a first preferred embodiment of the present invention. The objective of the present invention is to provide a single-chip USB-based host-to-host networking method capable of using at least a first pipe, a second pipe and a third pipe defined by the USB specification for transferring streams of data between a first host C1 and a second host C2. Wherein the first pipe P0 is used for transferring command and status information, and the third pipe P2 is to used for receiving the command and the status from the first pipe P0, and the second pipe P1 is used for two-way transmission between the first host C1 and the second host C2. Each pipe has a corresponding specific identifier. The command and status information corresponding to the first pipe P0 and the second pipe P1 are separately defined by a first identifier ID0 and a third identifier ID2, and the destination information is defined by a second identifier ID1. For clarity, hereinafter the identifiers for the first host C1 are $ID0_1$, $ID1_1$, $ID2_1$, and the identifiers for the second host C2 are $ID0_2$, $ID1_2$, $ID2_2$, in addition, the three pipes for the first host C1 are $P0_1$, $P1_1$, $P2_1$; other three pipes for the second host C2 are $P0_2$, $P1_2$, $P2_2$.

Figure 3:
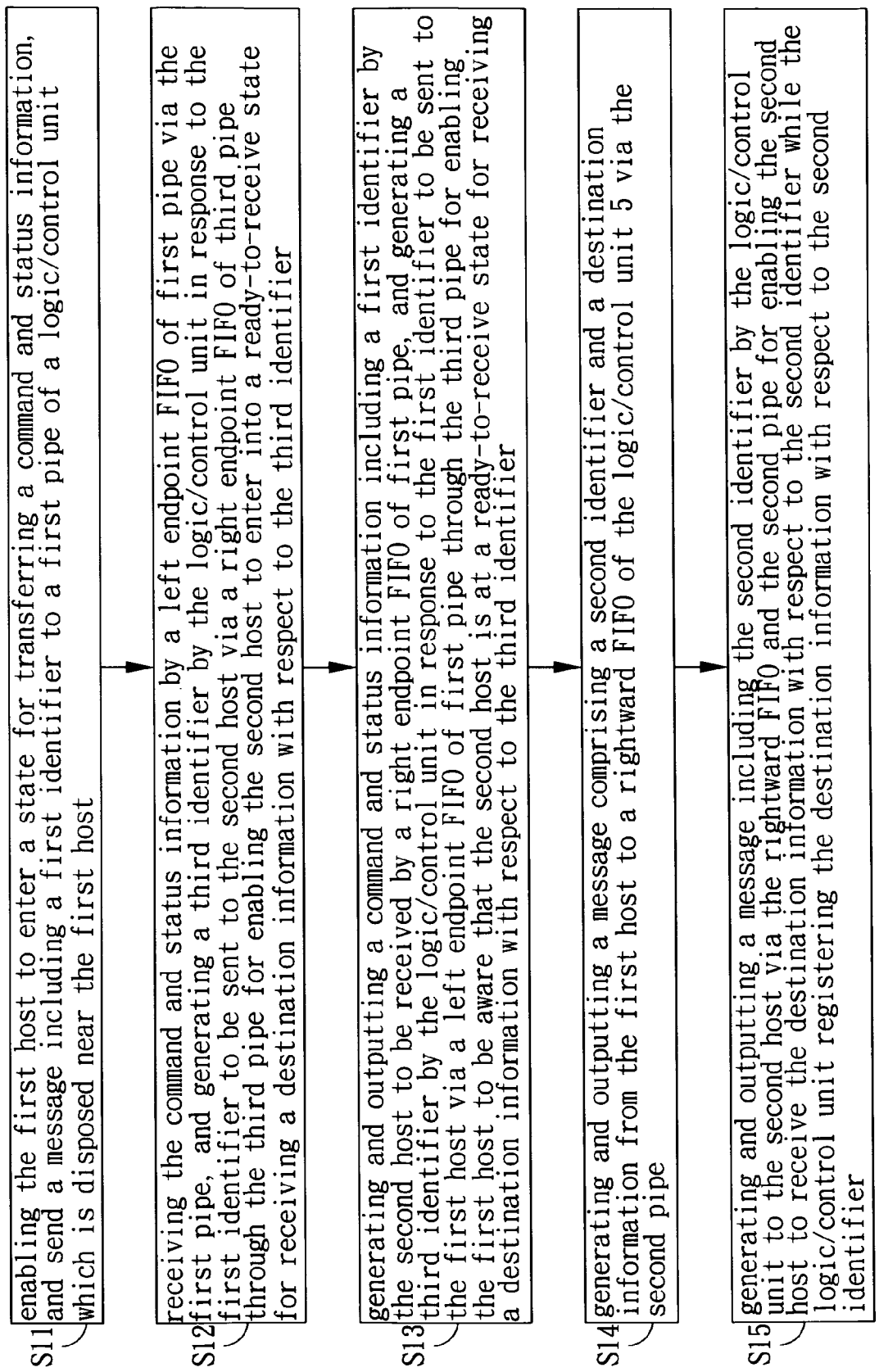
FIG. 3 is a flowchart depicting the first preferred embodiment of the present invention.

The method of the present invention for transferring the command and status information and the destination information is that: using the first identifier ID0 to transfer the command and status information via the first pipe P0, and using the third identifier ID2 to receive the command and status information via the third pipe P2, and using the second identifier ID1 to transfer the destination information via the second pipe P1. Referring to FIG. 3, which is a flowchart depicting the first preferred embodiment of the present invention. The flowchart comprises step of:

Step S11: enabling the first host C1 to enter a state for transferring a command and status information, and send a message including a first identifier $ID0_1$ to a first pipe $P0_1$ of a logic/control unit 5 which is disposed near the first host C1;

Step S12: receiving the command and status information by a left endpoint FIFO $P0_L$ of first pipe $P0_1$ via the first pipe P0, and generating a third identifier $ID2_2$ by the logic/control unit 5 in response to the first identifier $ID0_1$ to be sent to the second host C2 via a right endpoint FIFO $P2_R$ of third pipe P2 through the third pipe $P2_2$ for enabling the second host C2 to enter into a ready-to-receive state for receiving a destination information with respect to the third identifier $ID2_2$;

Step S13: generating and outputting a command and status information including a first identifier $ID0_2$ by the second host C2 to be received by a right endpoint FIFO $P0_R$ of first pipe P0, and generating a third identifier $ID2_1$ by the logic/control unit 5 in response to the first identifier $ID0_2$ to be sent to the first host C1 via a left endpoint FIFO $P0_L$ of first pipe P0 through the third pipe $P2_1$ for enabling the first host C1 to be aware that the second host is at a ready-to-receive state for receiving a destination information with respect to the third identifier $ID2_1$;

Step S14: generating and outputting a message comprising a second identifier $ID1_1$ and a destination information from the first host C1 to a rightward FIFO $P_R$ of the logic/control unit 5 via the second pipe $P1_1$ Step S15: generating and outputting a message including the second identifier $ID1_2$ by the logic/control unit 5 to the second host C2 via the rightward FIFO $P_R$ and the second pipe $P1_2$ for enabling the second host C2 to receive the destination information with respect to the second identifier $ID1_2$ while the logic/control unit 5 registering the destination information with respect to the second identifier $ID1_2$.

The above steps describe that the mode of the information being transferred from the first host C1 to the second host C2, and the steps for the vice versa are as following:

Step S11': enabling the second host C2 to enter a state for transferring a command and status information, and send a message including a first identifier $ID0_2$ to a first pipe $P0_2$ of a logic/control unit 5 which is disposed near the second host C2;

Step S12': receiving the command and status information by a right endpoint FIFO $P0_R$ of first pipe $P0_2$ via the first pipe P0, and generating a third identifier $ID2_1$ by the logic/control unit 5 in response to the first identifier $ID0_2$ to be sent to the first host C1 via a left endpoint FIFO $P2_L$ of third pipe P2 through the third pipe $P2_1$ for enabling the first host C1 to enter into a ready-to-receive state for receiving a destination information with respect to the third identifier $ID2_1$;

Step S13': generating and outputting a command and status information including a first identifier $ID0_1$ by the first host C1 to be received by a left endpoint FIFO $P0_L$ of first pipe P0, and generating a third identifier $ID2_2$ by the logic/control unit 5 in response to the first identifier $ID0_1$ to be sent to the second host C2 via a right endpoint FIFO $P0_R$ of third pipe P2 through the third pipe $P2_1$ for enabling the second host C2 to be aware that the first host is at a ready-to-receive state for receiving a destination information with respect to the third identifier $ID2_2$;

Step S14': generating and outputting a message comprising a second identifier $ID1_2$ and a destination information from the second host C2 to a leftward FIFO $P_L$ of the logic/control unit 5 via the second pipe $P1_2$ Step S15': generating and outputting a message including the second identifier $ID1_1$ by the logic/control unit 5 to the first host C1 via the leftward FIFO $P_L$ and the second pipe $P1_1$ for enabling the first host C1 to receive the destination information with respect to the second identifier $ID1_1$ while the logic/control unit 5 registering the destination information with respect to the second identifier $ID1_1$.

Figure 4:
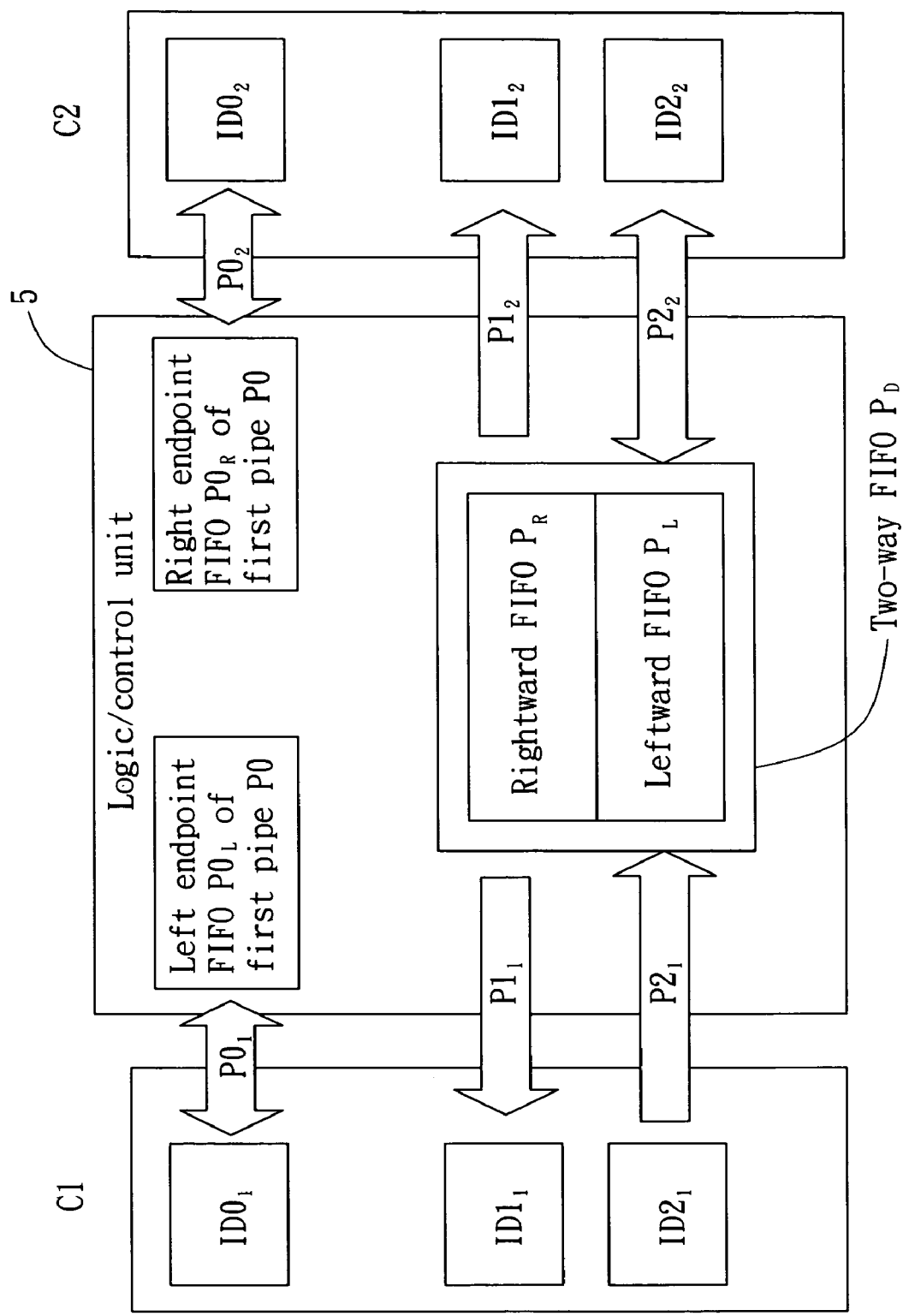
FIG. 4 is a diagram showing a second preferred embodiment of the present invention.

Please refer to FIG. 4, which is a diagram depicting a second preferred embodiment of the present invention. The objective of the present invention is to provide a single-chip USB-based host-to-host networking method capable of using at least a first pipe, a second pipe and a third pipe defined by the USB specification for transferring streams of data between a first host C1 and a second host C2. Wherein the first pipe P0 is used for transferring command and status information, comprising a first pipe $P0_1$ disposed near the first host C1 and a first pipe $P0_2$ disposed near the second host C2, and the second pipe P1 and the third pipe P2 are respectively used for outputting and inputting a destination information with respect to the command and status information of the first pipe P0. For clarity, hereinafter the identifiers for the first host C1 are $ID0_1$, $ID1_1$, $ID2_1$, and the identifiers for the second host C2 are $ID0_2$, $ID1_2$, $ID2_2$, in addition, the three pipes for the first host C1 are $P0_1$, $P1_1$, $P2_1$; other three pipes for the second host C2 are $P0_2$, $P1_2$, $P2_2$, and a two-way FIFO $P_D$ comprises a rightward FIFO $P_R$ and a leftward FIFO $P_L$.

Figure 5:
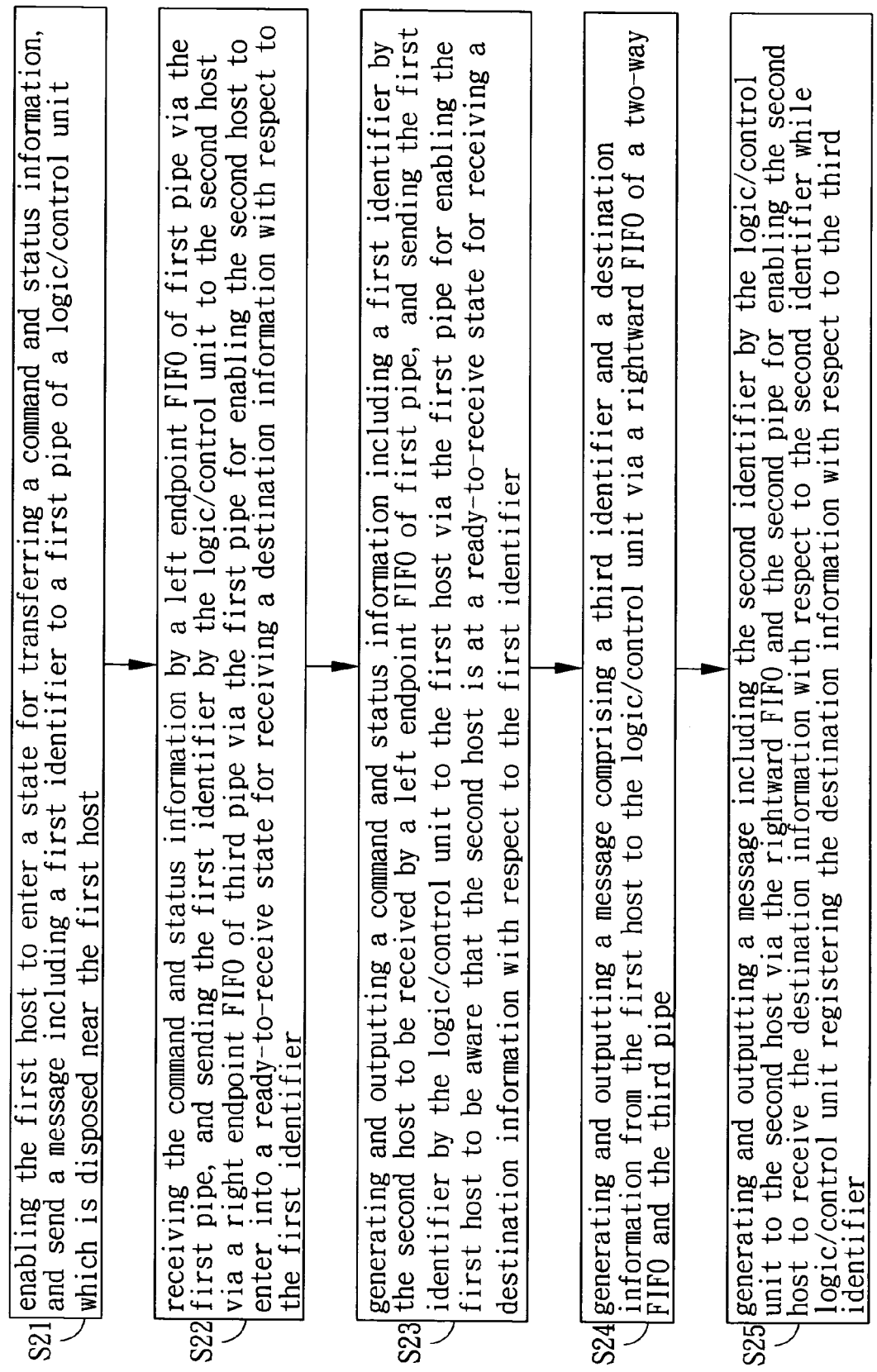
FIG. 5 is a flowchart depicting the second preferred embodiment of the present invention.

The method of the present invention for transferring the command and status information and the destination information is that: using the first identifier ID0 to transfer the command and status information via the first pipe P0, and using the second identifier ID1 and the third identifier ID2 to transfer the destination information. Referring to FIG. 5, which is a flowchart depicting the second preferred embodiment of the present invention. The flowchart comprises step of:

Step S21: enabling the first host C1 to enter a state for transferring a command and status information, and send a message including a first identifier $ID0_1$ to a first pipe $P0_1$ of a logic/control unit 5 which is disposed near the first host C1;

Step S22: receiving the command and status information by a left endpoint FIFO $P0_L$ of first pipe P0 via the first pipe $P0_1$, and sending the first identifier $ID0_2$ by the logic/control unit 5 to the second host C2 via a right endpoint FIFO $P2_R$ of third pipe P2 via the first pipe $P0_2$ for enabling the second host C2 to enter into a ready-to-receive state for receiving a destination information with respect to the first identifier $ID0_1$;

Step S23: generating and outputting a command and status information including a first identifier $ID0_2$ by the second host C2 to be received by a left endpoint FIFO $P0_L$ of first pipe P0, and sending the first identifier $ID0_1$ by the logic/control unit 5 to the first host C1 via the first pipe $P0_2$ for enabling the first host C1 to be aware that the second host is at a ready-to-receive state for receiving a destination information with respect to the first identifier $ID0_2$;

Step S24: generating and outputting a message comprising a third identifier $ID2_1$ and a destination information from the first host C1 to the logic/control unit 5 via a rightward FIFO $P_R$ of a two-way FIFO $P_D$ and the third pipe $P2_1$;

Step S25: generating and outputting a message including the second identifier $ID1_2$ by the logic/control unit 5 to the second host C2 via the rightward FIFO $P_R$ and the second pipe $P1_2$ for enabling the second host C2 to receive the destination information with respect to the second identifier $ID1_2$ while the logic/control unit 5 registering the destination information with respect to the third identifier $ID2_1$.

The above steps describe that the mode of the information being transferred from the first host C1 to the second host C2, and the steps for the vice versa are as following:

Step S21': enabling the second host C2 to enter a state for transferring a command and status information, and send a message including a first identifier $ID0_2$ to a first pipe $P0_2$ of a logic/control unit 5 which is disposed near the second host C2;

Step S22': receiving the command and status information by a left endpoint FIFO $P0_L$ of first pipe P0 via the first pipe $P0_2$, and sending the first identifier $ID0_2$ by the logic/control unit 5 to the first host C1 via the first pipe $P0_1$ for enabling the first host C1 to enter into a ready-to-receive state for receiving a destination information with respect to the first identifier $ID0_2$;

Step S23': generating and outputting a command and status information including a first identifier $ID0_1$ by the first host C1 to be received by a right endpoint FIFO $P0_R$ of first pipe P0 via the first pipe $P0_1$, and sending the first identifier $ID0_1$ by the logic/control unit 5 to the second host C2 via the first pipe $P0_2$ for enabling the second host C2 to be aware that the first host is at a ready-to-receive state for receiving a destination information with respect to the first identifier $ID0_1$;

Step S24': generating and outputting a message comprising a third identifier $ID2_2$ and a destination information from the second host C2 to the logic/control unit 5 via a leftward FIFO $P_L$ of a two-way FIFO $P_D$ and the third pipe $P2_2$;

Step S25': generating and outputting a message including the second identifier $ID1_1$ by the logic/control unit 5 to the first host C1 via the leftward FIFO $P_L$ and the second pipe $P1_1$ for enabling the first host C1 to receive the destination information with respect to the second identifier $ID1_1$ while the logic/control unit 5 registering the destination information with respect to the third identifier $ID2_2$.

Figure 6:
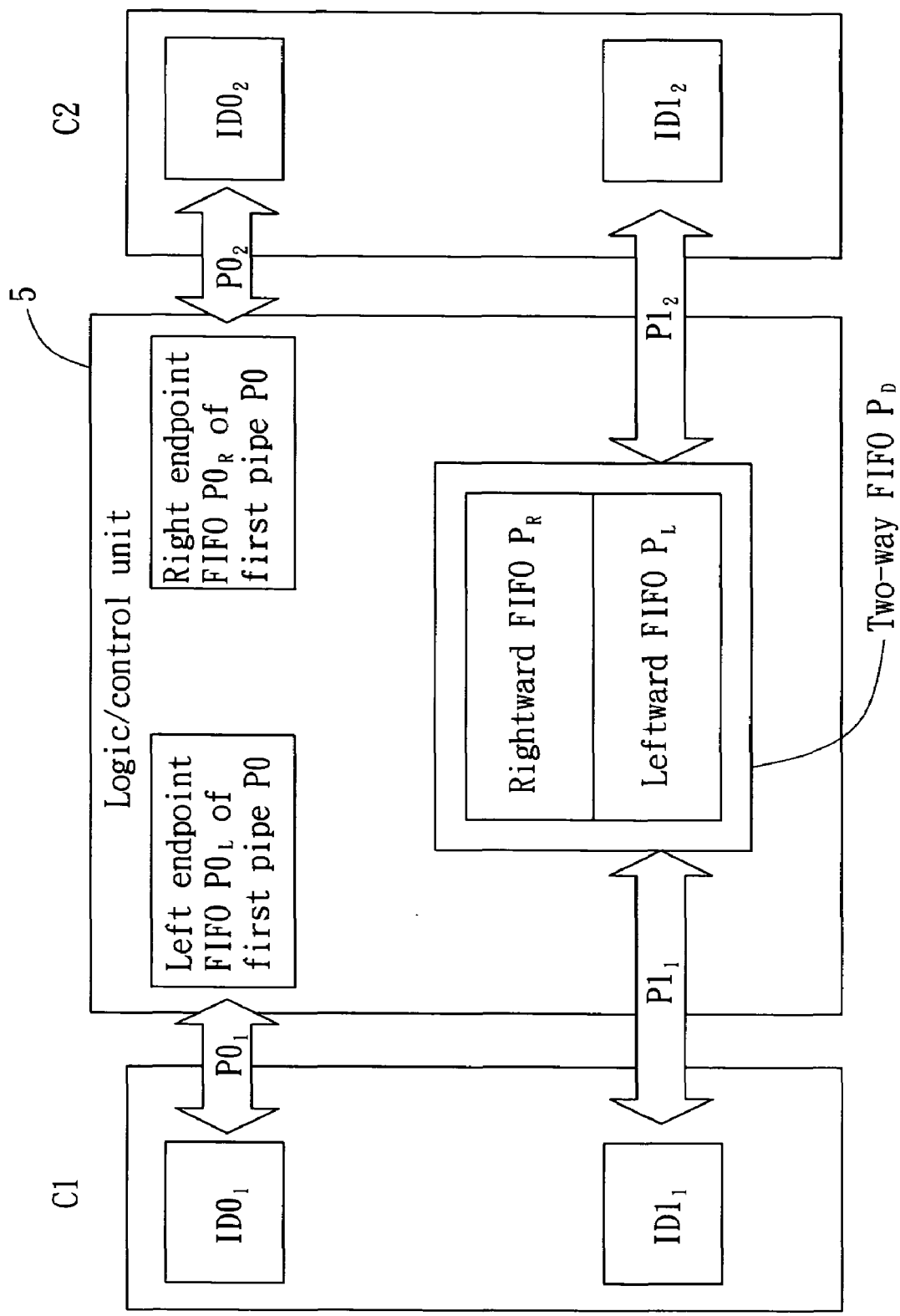
FIG. 6 is a diagram showing a third preferred embodiment of the present invention.

Please refer to FIG. 6, which is a diagram showing a third preferred embodiment of the present invention, and the embodiment is an extended application of the second preferred embodiment. As seen, although the present embodiment substantially has at least a first pipe, a second pipe and a third pipe defined by the USB specification, but two of the one-way pipes can be logically combined into a a two-way pipe. Each pipe has a corresponding specific identifier. A first identifier ID0 is used for corresponding with the first pipe P0, and a second identifier ID1 is used for corresponding with the two-way pipe P1. Wherein the first pipe P0 is used for transferring command and status information, and the second pipe P1 is used for outputting/inputting destination information with respect to the command and status information of the first pipe P0. For clarity, hereinafter the identifiers for the first host C1 are $ID0_1$, $ID1_1$, and the identifiers for the second host C2 are $ID0_2$, $ID1_2$, in addition, the three pipes for the first host C1 are $P0_1$, $P1_1$, other two pipes for the second host C2 are $P0_2$, $P1_2$.

Figure 7:
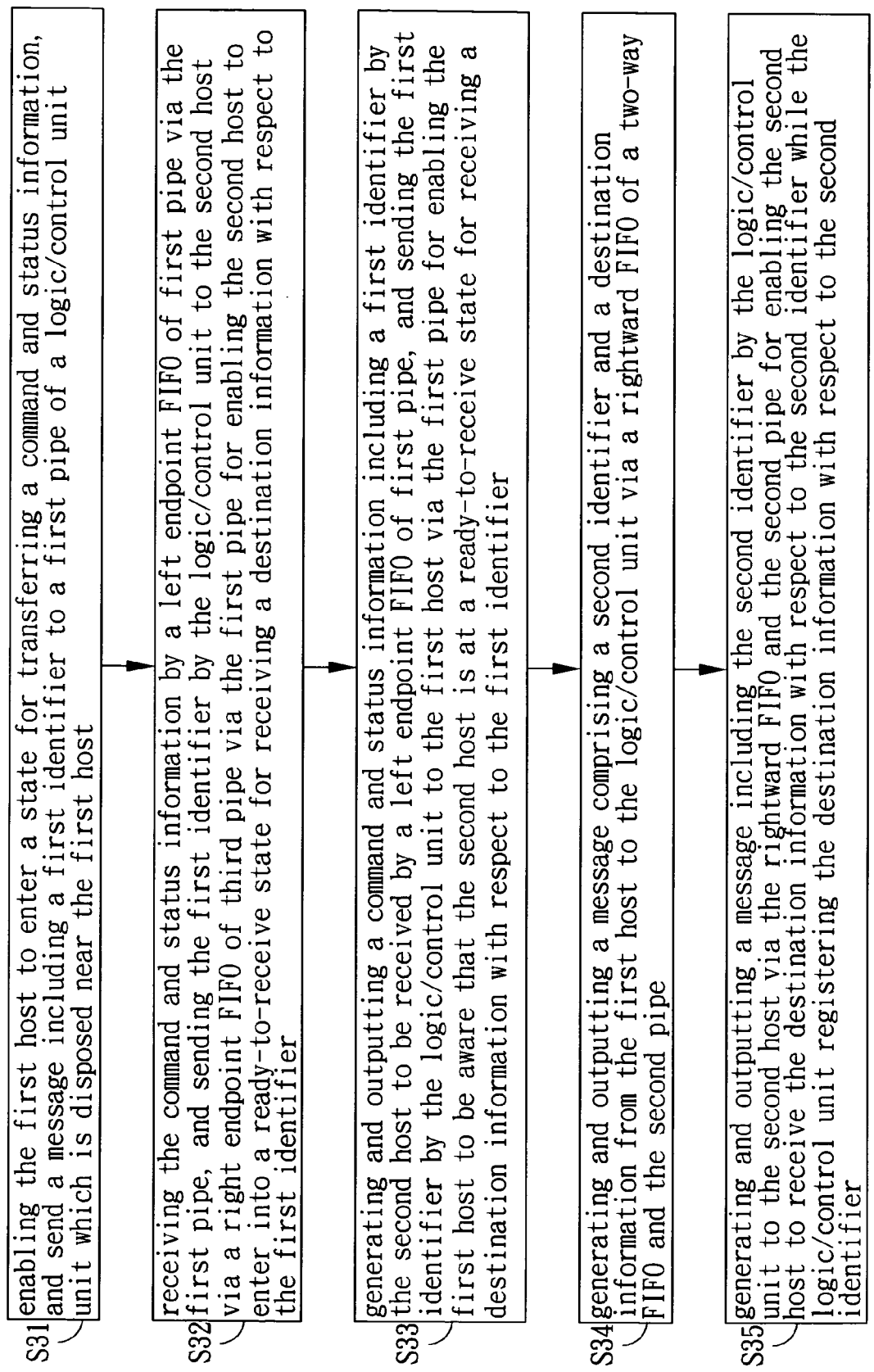
FIG. 7 is a flowchart depicting the third preferred embodiment of the present invention.

The method of the present invention for transferring the command and status information and the destination information is that: using the first identifier ID0 to transfer the command and status information via the first pipe P0, and using the second identifier ID1 to transfer the destination information. Referring to FIG. 7, which is a flowchart depicting the third preferred embodiment of the present invention. The flowchart comprises step of:

Step S31: enabling the first host C1 to enter a state for transferring a command and status information, and send a message including a first identifier $ID0_1$ to a first pipe $P0_1$ of a logic/control unit 5 which is disposed near the first host C1;

Step S32: receiving the command and status information by a left endpoint FIFO $P0_L$ of first pipe P0 via the first pipe $P0_1$, and sending the first identifier $ID0_2$ by the logic/control unit 5 to the second host C2 via a right endpoint FIFO $P2_R$ of third pipe P2 via the first pipe $P0_2$ for enabling the second host C2 to enter into a ready-to-receive state for receiving a destination information with respect to the first identifier $ID0_1$;

Step S33: generating and outputting a command and status information including a first identifier $ID0_2$ by the second host C2 to be received by a left endpoint FIFO $P0_L$ of first pipe P0, and sending the first identifier $ID0_1$ by the logic/control unit 5 to the first host C1 via the first pipe $P0_2$ for enabling the first host C1 to be aware that the second host is at a ready-to-receive state for receiving a destination information with respect to the first identifier $ID0_2$;

Step S34: generating and outputting a message comprising a second identifier $ID1_1$ and a destination information from the first host C1 to the logic/control unit 5 via a rightward FIFO $P_R$ of a two-way FIFO $P_D$ and the second pipe $P1_2$;

Step S35: generating and outputting a message including the second identifier $ID1_2$ by the logic/control unit 5 to the second host C2 via the rightward FIFO $P_R$ and the second pipe $P1_2$ for enabling the second host C2 to receive the destination information with respect to the second identifier $ID1_2$ while the logic/control unit 5 registering the destination information with respect to the second identifier $ID1_2$.

The above steps describe that the mode of the information being transferred from the first host C1 to the second host C2, and the steps for the vice versa are as following:

Step S31': enabling the second host C2 to enter a state for transferring a command and status information, and send a message including a first identifier $ID0_2$ to a first pipe $P0_2$ of a logic/control unit 5 which is disposed near the second host C2;

Step S32': receiving the command and status information by a left endpoint FIFO $P0_L$ of first pipe P0 via the first pipe $P0_2$, and sending the first identifier $ID0_2$ by the logic/control unit 5 to the first host C1 via the first pipe $P0_1$ for enabling the first host C1 to enter into a ready-to-receive state for receiving a destination information with respect to the first identifier $ID0_2$;

Step S33': generating and outputting a command and status information including a first identifier $ID0_1$ by the first host C1 to be received by a right endpoint FIFO $P0_R$ of first pipe P0 via the first pipe $P0_1$, and sending the first identifier $ID0_1$ by the logic/control unit 5 to the second host C2 via the first pipe $P0_2$ for enabling the second host C2 to be aware that the first host is at a ready-to-receive state for receiving a destination information with respect to the first identifier $ID0_1$;

Step S34': generating and outputting a message comprising a second identifier $ID1_2$ and a destination information from the second host C2 to the logic/control unit 5 via a leftward FIFO $P_L$ of a two-way FIFO $P_D$ and the third pipe $P2_2$;

Step S35': generating and outputting a message including the second identifier $ID1_1$ by the logic/control unit 5 to the first host C1 via the leftward FIFO $P_L$ and the second pipe $P1_1$ for enabling the first host C1 to receive the destination information with respect to the second identifier $ID1_1$ while the logic/control unit 5 registering the destination information with respect to the second identifier $ID1_1$.

Figure 8:
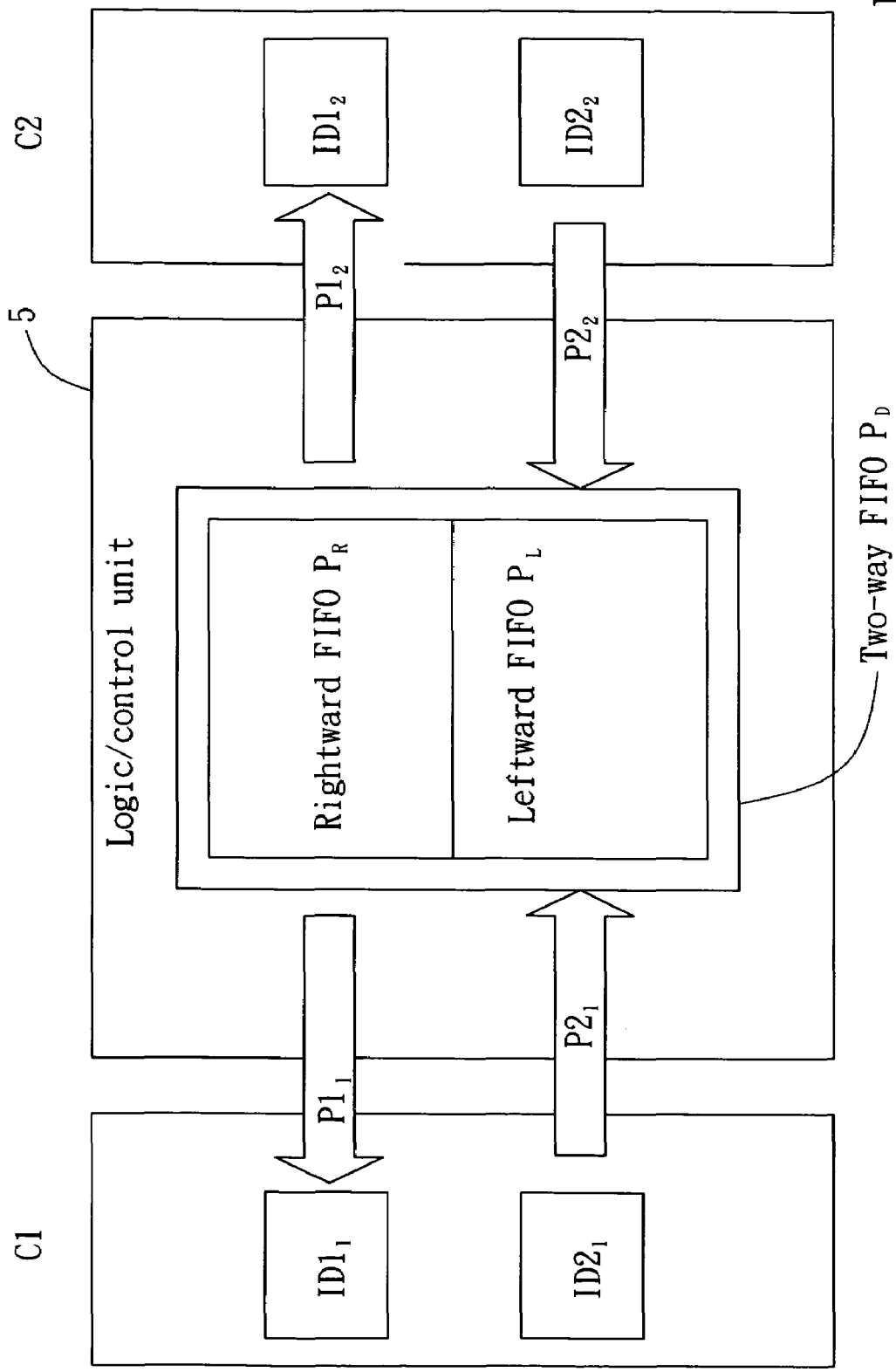
FIG. 8 is a diagram showing a fourth preferred embodiment of the present invention.

Please refer to FIG. 8, which is a diagram depicting a fourth preferred embodiment of the present invention. The fourth embodiment is different from the previous three embodiments by that it adopts different protocol by way of self-definition to complete a new mode of data transfer, because of only one USB bus for entity. Previously, Each pipe has a corresponding specific identifier or at least a first identifier ID0 is being defined for transferring command and status information since there is substantially only one bus existed. Sometimes even two identifiers are being used for handshaking to establish the operation of the command and status information. In practice, the establishment of the operation of the command and status information is only being performed once before transferring the destination information. Therefore, each identifier can be equipped with command/status/destination information simultaneously through the execution of the driver layer.

In the present embodiment, each side of an entity has two pipes comprising the protocol of the command/status/destination information, that the protocol is supported by the driver layer. As for the logic/control unit only being used as a two-way communication channel between the two hosts. For clarity, hereinafter the identifiers for the first host C1 are $ID1_1$, $ID2_1$, and the identifiers for the second host C2 are $ID1_2$, $ID2_2$, in addition, the three pipes for the first host C1 are $P1_1$, $P2_1$, other two pipes for the second host C2 are $P1_2$, $P2_2$.

Figure 9:
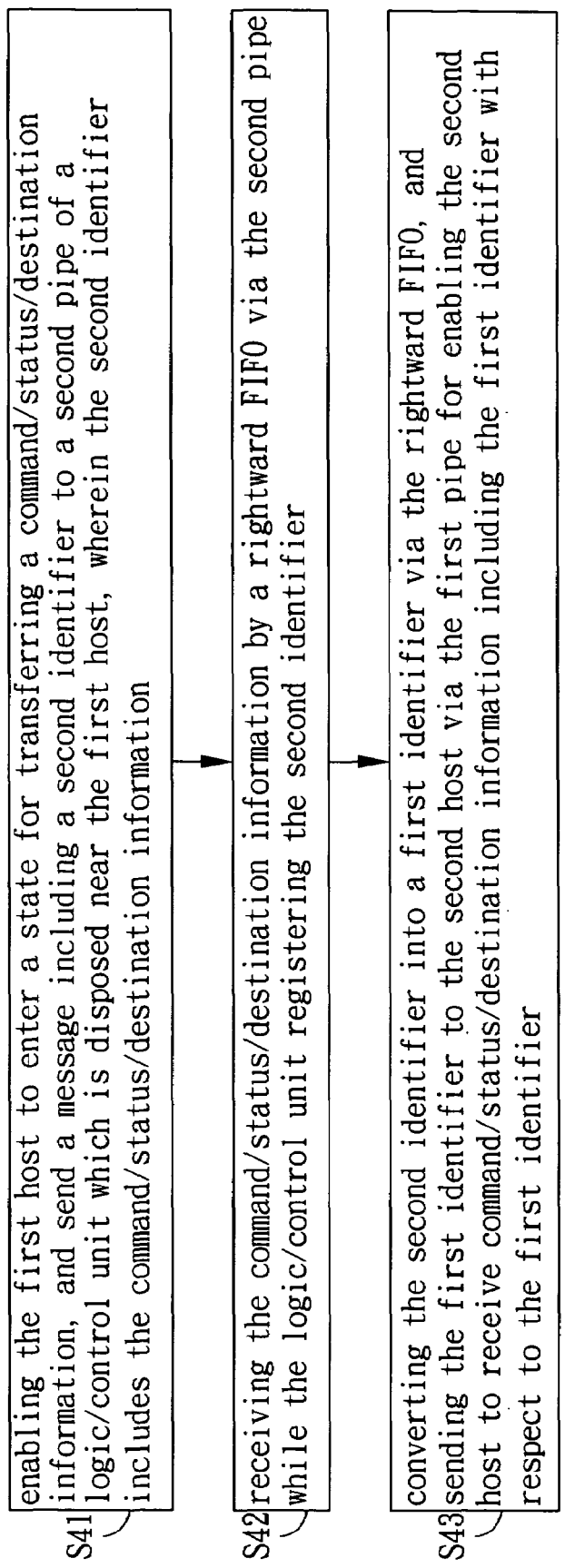
FIG. 9 is a flowchart depicting the fourth preferred embodiment of the present invention.

The method of the present invention for transferring the command and status information and the destination information is that: using the second identifier ID2 to transfer the command/status/destination information via the first pipe P1, and using the first identifier ID1 to receive the command/status/destination information. Referring to FIG. 9, which is a flowchart depicting the fourth preferred embodiment of the present invention. The flowchart comprises step of:

Step S41: enabling the first host C1 to enter a state for transferring a command/status/destination information, and send a message including a second identifier $ID2_1$ to a second pipe $P2_1$ of a logic/control unit 5 which is disposed near the first host C1, wherein the second identifier $ID2_1$ includes the command/status/destination information;

Step S42: receiving the command/status/destination information by a rightward FIFO $P_R$ via the second pipe $P2_1$ while the logic/control unit 5 registering the second identifier $ID2_1$;

Step S43: converting the second identifier ID2, into a first identifier $ID1_2$ via the rightward FIFO $P_R$, and sending the first identifier $ID1_2$ to the second host C2 via the first pipe $P1_2$ for enabling the second host to receive command/status/destination information including the first identifier $ID1_2$ with respect to the first identifier $ID1_2$.

The above steps describe that the mode of the information being transferred from the first host C1 to the second host C2, and the steps for the vice versa are as following:

Step S41': enabling the second host C2 to enter a state for transferring a command/status/destination information, and send a message including a second identifier $ID2_2$ to a second pipe $P2_2$ of a logic/control unit 5 which is disposed near the second host C2, wherein the second identifier $ID2_2$ includes the command/status/destination information;

Step S42': receiving the command/status/destination information by a leftward FIFO $P_L$ via the second pipe $P2_2$ while the logic/control unit 5 registering the second identifier $ID2_2$;

Step S43': converting the second identifier $ID2_2$ into a first identifier $ID1_1$ via the leftward FIFO $P_L$, and sending the first identifier $ID1_1$ to the first host Ca via the first pipe $P1_1$ for enabling the first host to receive command/status/destination information including the first identifier $ID1_1$ with respect to the first identifier $ID1_1$.

Figure 10:
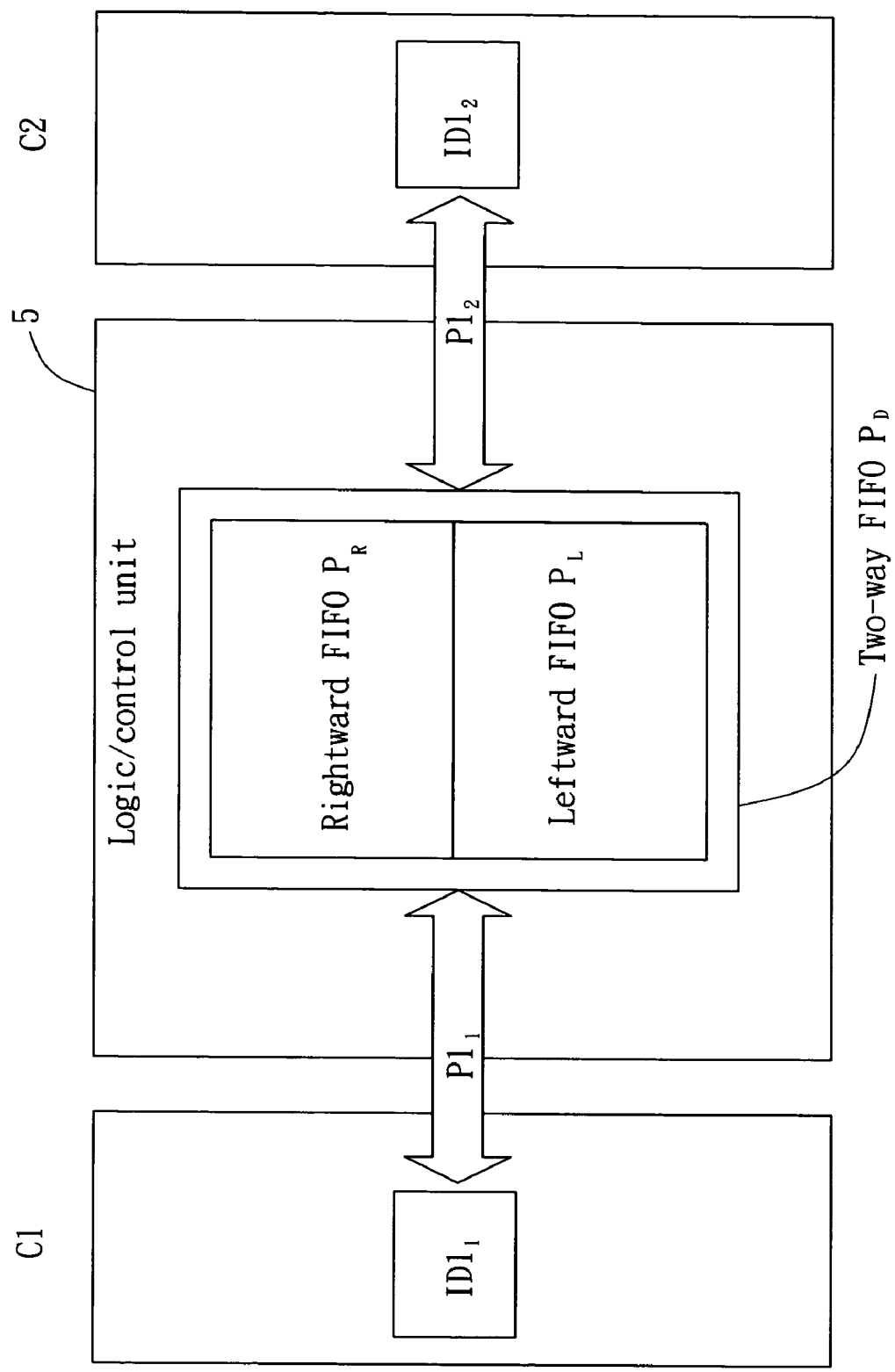
FIG. 10 is a diagram showing a fifth preferred embodiment of the present invention.

Please refer to FIG. 10, which is diagram depicting a fifth preferred embodiment of the present invention by declaring the two pipes of the fourth embodiment with correspondence to a same identifier, such that the USB networking device only needs one identifier to complete the information transmission. Similarly, Therefore, each identifier can be equipped with command/status/destination information simultaneously through the execution of the driver layer.

Figure 11:
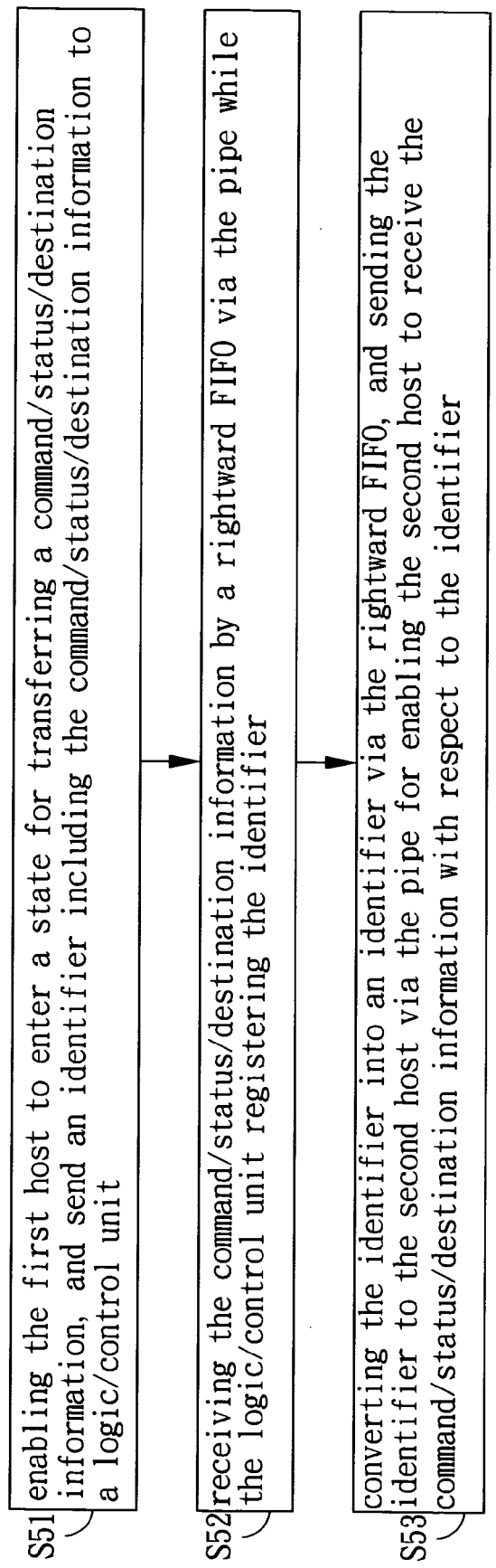
FIG. 11 is a flowchart depicting the fifth preferred embodiment of the present invention.

The method of the present invention for transferring the command and status information and the destination information is that: using the second identifier ID2 to transfer the command/status/destination information via the first pipe P1, and using the first identifier ID1 to receive the command/status/destination information. Referring to FIG. 11, which is a flowchart depicting the fifth preferred embodiment of the present invention. The flowchart comprises step of:

Step S51: enabling the first host C1 to enter a state for transferring a command/status/destination information, and send an identifier $ID1_1$ including the command/status/destination information to a pipe $P1_1$ of a logic/control unit 5;

Step S52: receiving the command/status/destination information by a rightward FIFO $P_R$ via the pipe $P1_1$ while the logic/control unit 5 registering the second identifier $ID1_1$;

Step S53: converting the identifier $ID1_1$ into an identifier $ID1_2$ via the rightward FIFO $P_R$, and sending the identifier $ID1_2$ to the second host C2 via the pipe $P1_2$ for enabling the second host to receive command/status/destination information with respect to the identifier $ID1_2$.

The above steps describe that the mode of the information being transferred from the first host C1 to the second host C2, and the steps for the vice versa are as following:

Step S51': enabling the second host C2 to enter a state for transferring a command/status/destination information, and send an identifier $ID1_2$ including the command/status/destination information to a pipe $P1_2$ of a logic/control unit 5;

Step S52': receiving the command/status/destination information by a leftward FIFO $P_L$ via the pipe $P1_2$ while the logic/control unit 5 registering the second identifier $ID1_2$;

Step S53': converting the identifier $ID1_2$ into an identifier $ID1_1$ via the leftward FIFO $P_L$, and sending the identifier $ID1_2$ to the first host C1 via the pipe $P_1$ for enabling the first host to receive command/status/destination information with respect to the identifier $ID1_1$.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An USB-based host-to-host networking method, the method using at least a first identifier, a second identifier and a third identifier all defined by the USB specification for networking at least a first host and a second host, the method comprising:

enabling the first host to enter a state for transferring a command and status information, and send a message including the first identifier to a first pipe of a logic/control unit;

receiving the command and status information by a left endpoint FIFO of first pipe via the first pipe, and generating the third identifier by the logic/control unit in response to the first identifier to be sent to the second host via a right endpoint FIFO of third pipe through the third pipe for enabling the second host to enter into a ready-to-receive state for receiving a destination information with respect to the third identifier;

generating and outputting a command and status information including the first identifier by the second host to be received by a right endpoint FIFO of first pipe, and generating the third identifier by the logic/control unit in response to the first identifier to be sent to the first host via the left endpoint FIFO of first pipe through the third pipe for enabling the first host to be aware that the second host is at a ready-to-receive state for receiving the destination information with respect to the third identifier;

generating and outputting a message comprising the second identifier and the destination information from the first host to a rightward FIFO of the logic/control unit via a second pipe; and generating and outputting a message including the second identifier by the logic/control unit to the second host via the rightward FIFO and the second pipe for enabling the second host to receive the destination information with respect to the second identifier while the logic/control unit registers the destination information with respect to the second identifier.

2. The USB-based host-to-host networking method as cited in claim 1, wherein the message including the first identifier is a packet of the first identifier, and the message including the second identifier is a packet of the second identifier, and the message including the third identifier is a packet of the third identifier.

3. The USB-based host-to-host networking method as cited in claim 1, wherein the first identifier is a ready-to-transfer command instruction.

4. The USB-based host-to-host networking method as cited in claim 1, wherein the third identifier is a ready-to-receive command instruction.

5. The USB-based host-to-host networking method as cited in claim 1, wherein the second identifier is a command instruction for transferring/receiving destination information.

6. The USB-based host-to-host networking method as cited in claim 1, wherein streams of data are transferred to the first host from the second host.

7. The USB-based host-to-host networking method as cited in claim 1, wherein the logic/control unit comprises a register.

8. The USB-based host-to-host networking method as cited in claim 7, wherein the register is a set of FIFO buffers with one-way input/output.

9. The USB-based host-to-host networking method as cited in claim 7, wherein the register is a set of FIFO buffers with two-way input/output.

10. An USB-based host-to-host networking method, the method using at least a first identifier, a second identifier and a third identifier all defined by the USB specification for networking at least a first host and a second host, the method comprising:

enabling the first host to enter a state for transferring a command and status information, and send a message including the first identifier to a first pipe of a logic/control unit;

receiving the command and status information by a left endpoint FIFO of first pipe via the first pipe, and sending the first identifier by the logic/control unit to the second host via a right endpoint FIFO of third pipe via the first pipe for enabling the second host to enter into a ready-to-receive state for receiving a destination information with respect to the first identifier;

generating and outputting a command and status information including the first identifier by the second host to be received by a left endpoint FIFO of first pipe, and sending the first identifier by the logic/control unit to the first host via the first pipe for enabling the first host to be aware that the second host is at a ready-to-receive state for receiving a destination information with respect to the first identifier;

generating and outputting a message comprising a third identifier and the destination information from the first host to the logic/control unit via a rightward FIFO of a two-way FIFO and the third pipe; and generating and outputting a message including the second identifier by the logic/control unit to the second host via the rightward FIFO and a second pipe for enabling the second host to receive the destination information with respect to the second identifier while the logic/control unit registers the destination information with respect to the third identifier.

11. The USB-based host-to-host networking method as cited in claim 10, wherein the message including the first identifier is a packet of the first identifier, and the message including the second identifier is a packet of the second identifier, and the message including the third identifier is a packet of the third identifier.

12. The USB-based host-to-host networking method as cited in claim 10, wherein the first identifier is a ready-to-transfer/receive command instruction.

13. The USB-based host-to-host networking method as cited in claim 10, wherein the third identifier is a command instruction for transferring/receiving destination information.

14. The USB-based host-to-host networking method as cited in claim 10, wherein the second identifier is a command instruction of receiving destination information.

15. The USB-based host-to-host networking method as cited in claim 10, wherein streams of data are transferred to the first host from the second host.

16. The USB-based host-to-host networking method as cited in claim 10, wherein the logic/control unit comprises a register.

17. The USB-based host-to-host networking method as cited in claim 16, wherein the register is a set of FIFO buffers with one-way input/output.

18. The USB-based host-to-host networking method as cited in claim 16, wherein the register is a set of FIFO buffers with two-way input/output.

19. An USB-based host-to-host networking method, the method using at least a first identifier, and a second identifier both defined by the USB specification for networking at least a first host and a second host, the method comprising:

enabling the first host to enter a state for transferring a command and status information, and send a message including a first identifier to a first pipe of a logic/control unit;

receiving the command and status information by a left endpoint FIFO of first pipe via the first pipe, and sending the first identifier by the logic/control unit to the second host via a right endpoint FIFO of third pipe via the first pipe for enabling the second host to enter into a ready-to-receive state for receiving a destination information with respect to the first identifier;

generating and outputting a command and status information including a first identifier by the second host to be received by a left endpoint FIFO of first pipe, and sending the first identifier by the logic/control unit to the first host via the first pipe for enabling the first host to be aware that the second host is at a ready-to-receive state for receiving a destination information with respect to the first identifier;

generating and outputting a message comprising a second identifier and a destination information from the first host to the logic/control unit via a rightward FIFO of a two-way FIFO and a second pipe; and generating and outputting a message including the second identifier by the logic/control unit to the second host via the rightward FIFO and the second pipe for enabling the second host to receive the destination information with respect to the second identifier while the logic/control unit registers the destination information with respect to the second identifier.

20. The USB-based host-to-host networking method as cited in claim 19, wherein the message including the first identifier is a packet of the first identifier, and the message including the second identifier is a packet of the second identifier.

21. The USB-based host-to-host networking method as cited in claim 19, wherein the first identifier is a command instruction for preparing/receiving the control/status information.

22. The USB-based host-to-host networking method as cited in claim 19, wherein the second identifier is a command of transferring/receiving destination information.

23. The USB-based host-to-host networking method as cited in claim 19, wherein streams of data are transferred to the first host from the second host.

24. The USB-based host-to-host networking method as cited in claim 19, wherein the logic/control unit comprises a register.

25. The USB-based host-to-host networking method as cited in claim 24, wherein the register is a set of FIFO buffers with two-way input/output.

26. An USB-based host-to-host networking method, the method using at least a first identifier and a second identifier, each identifier being equipped with command/status/destination information through the execution of a driver layer, for networking at least a first host and a second host, the method comprising:

enabling the first host to enter a state for transferring the command/status/destination information, and send a message including the second identifier to a second pipe of a logic/control unit, wherein the second identifier includes the command/status/destination information; and receiving the command/status/destination information by a rightward FIFO via the second pipe while the logic/control unit registers the second identifier;

converting the second identifier into a first identifier via a rightward FIFO, and sending the first identifier to the second host via the first pipe for enabling the second host to receive command/status/destination information including the first identifier with respect to the first identifier.

27. The USB-based host-to-host networking method as cited in claim 26, wherein a message including the first identifier is a packet of the first identifier, and the message including the second identifier is a packet of the second identifier.

28. The USB-based host-to-host networking method as cited in claim 26, wherein the second identifier is a command instruction for transferring the control/status/destination information.

29. The USB-based host-to-host networking method as cited in claim 26, wherein the first identifier is a command instruction for receiving the control/status/destination information.

30. The USB-based host-to-host networking method as cited in claim 26, wherein streams of data are transferred to the first host from the second host.

31. The USB-based host-to-host networking method as cited in claim 26, wherein the logic/control unit comprises a register.

32. The USB-based host-to-host networking method as cited in claim 31, wherein the register is a set of FIFO buffers with one-way input/output.

33. The USB-based host-to-host networking method as cited in claim 31, wherein the register is a set of FIFO buffers with two-way input/output.

34. An USB-based host-to-host networking method, the method using at least a first identifier, the first identifier being equipped with command/status/destination information, for networking at least a first host and a second host, the method comprising:

enabling the first host to enter a state for transferring the command/status/destination information, and send the first identifier including the command/status/destination information to a pipe of a logic/control unit;

receiving the command/status/destination information by a rightward FIFO via the pipe while the logic/control unit registers the first; and converting the identifier into a second identifier via the rightward FIFO, and sending the second identifier to the second host via the pipe for enabling the second host to receive the command/status/destination information with respect to the second identifier.

35. The USB-based host-to-host networking method as cited in claim 34, wherein the first identifier is a command instruction for transferring the control/status/destination information.

36. The USB-based host-to-host networking method as cited in claim 34, wherein the first identifier is a command instruction for receiving the control/status/destination information.

37. The USB-based host-to-host networking method as cited in claim 34, wherein streams of data are transferred to the first host from the second host.

38. The USB-based host-to-host networking method as cited in claim 34, wherein the logic/control unit comprises a register.

39. The USB-based host-to-host networking method as cited in claim 38, wherein the register is a set of FIFO buffers with two-way input/output.

* * * * *